United States Patent [19]

Unfried et al.

[11] Patent Number: 5,061,085
[45] Date of Patent: Oct. 29, 1991

[54] THERMOSTATIC BIMETALLIC MEASURING ELEMENT

[75] Inventors: Helmut Unfried, Butzbach; Gerhard Wesner, Sulzbach/Ts, both of Fed. Rep. of Germany

[73] Assignee: VDO Adolf Schindling AG, Frankfurt am Main, Fed. Rep. of Germany

[21] Appl. No.: 488,336

[22] Filed: Mar. 2, 1990

[30] Foreign Application Priority Data

Apr. 29, 1989 [DE] Fed. Rep. of Germany ....... 3914279

[51] Int. Cl.$^5$ .............................................. G01K 5/00
[52] U.S. Cl. .................................... 374/205; 73/431; 116/332; 116/221
[58] Field of Search ............... 324/106; 374/205, 206, 374/207; 428/616, 101; 116/216, 217, 220, 221, 332; 24/701, 590, 591, 597; 16/42 R, 96 R, 87.2, 87.4 R; 73/431

[56] References Cited

U.S. PATENT DOCUMENTS

| | | | |
|---|---|---|---|
| 1,190,082 | 6/1916 | Baker | 374/205 |
| 2,112,047 | 3/1938 | Rich | 324/106 |
| 2,477,575 | 8/1949 | Bubser | 24/701 |
| 3,741,476 | 6/1973 | Travaglio | 374/205 X |
| 4,141,247 | 2/1979 | Schlick | 374/205 X |
| 4,169,381 | 10/1979 | Skopil | 116/332 X |
| 4,563,573 | 1/1986 | Hartelius et al. | 374/205 X |

FOREIGN PATENT DOCUMENTS 60789  5/1926  Sweden ............................ 24/701

Primary Examiner—David Trafton
Assistant Examiner—Joseph A. Rhoa
Attorney, Agent, or Firm—Martin A. Farber

[57] ABSTRACT

In a thermostatic bimetallic measuring element, an adjustment lever (5) which bears a thermostatic bimetallic body (6) is held, on the one hand, by a collar (24) of a setting eccentric (12) and, on the other hand, by a holding section (14) which is formed on a section of the adjustment lever (5) which engages through a slot in a rear plate (1) of the thermostatic bimetallic element and rests against the back of the rear plate (1). By turning the setting eccentric (12), displacement of the adjustment lever (5) is possible around an imaginary of actual pivot shaft which engages into the slot.

9 Claims, 5 Drawing Sheets

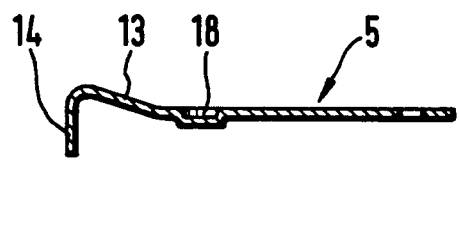
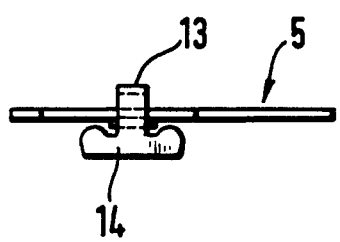
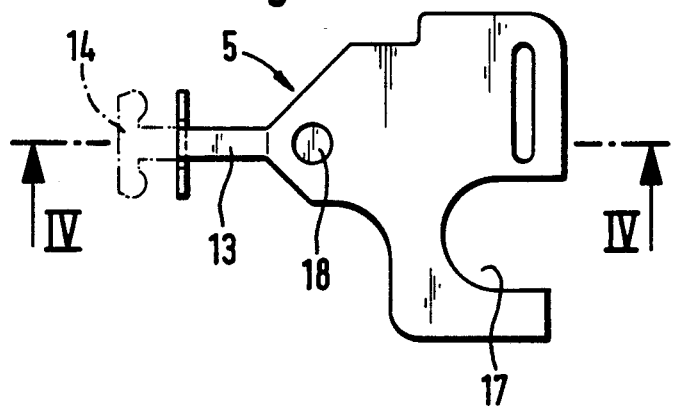

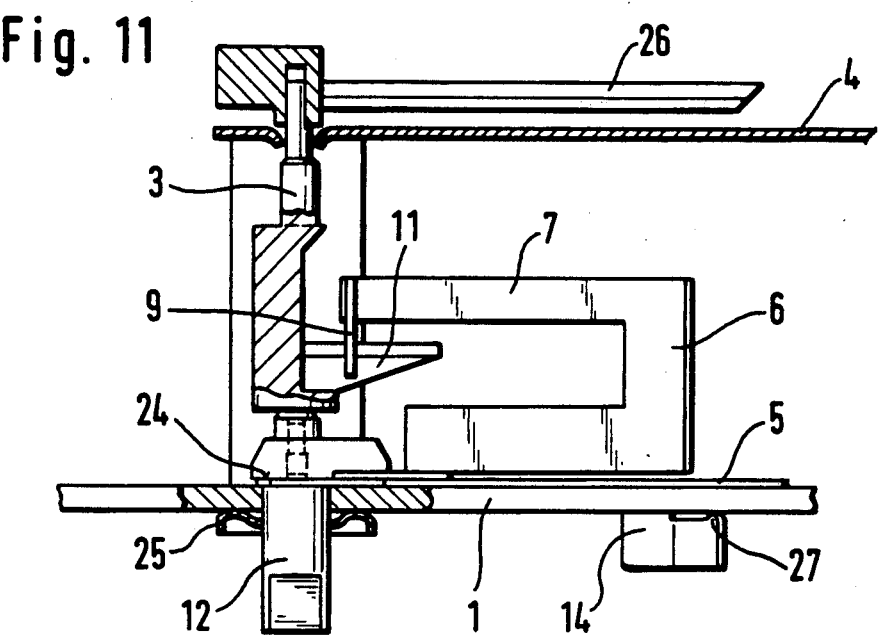
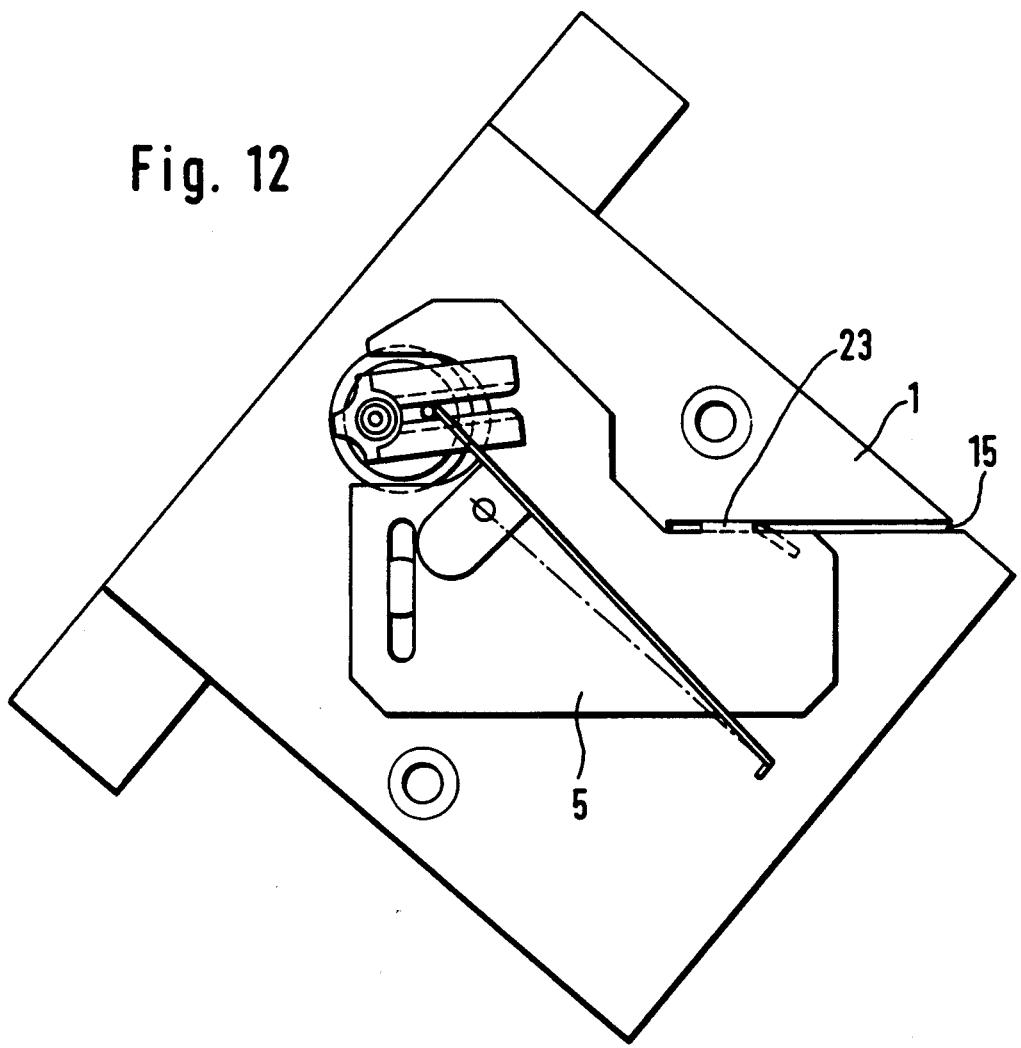

THERMOSTATIC BIMETALLIC MEASURING ELEMENT

FIELD AND BACKGROUND OF THE INVENTION

The present invention relates to a thermostatic bimetallic measuring element having a bimetallic body which is arranged on an adjustment lever. For an adjustment, the lever is held in swingable manner on a rear plate around a swing shaft which is displaceable in the rear plate.

Thermostatic bimetallic measuring elements of the above type are used, for instance, in motor vehicles in order, together with a supply transmitter, to measure the supply of liquid in a motor vehicle tank.

In such bimetallic measuring elements the bimetallic body generally engages by a pin into a slot guide which is provided in the radial direction in a structural part which is rigidly attached to a pointer shaft. A heating winding is traversed by a greater or lesser amount of current depending on a level of filling of liquid in a container, so that the bimetallic body is heated and deformed to a greater or lesser extent and turns the pointer shaft via the slot guide.

In order to be able to adjust such thermostatic bimetallic measuring elements, the bimetallic body is arranged on an adjustment lever which is fastened to the rear plate and, for adjustment, can be turned by means of a setting eccentric around a swing shaft. In addition, the lever can be displaced transversely thereto. In order to obtain this possibility of displacement, the adjustment lever is attached to the rear plate by screws which pass through slots. This leads to undesirably high manufacturing and assembling expenses.

SUMMARY OF THE INVENTION

It is an object of the invention to develop a thermostatic bimetallic measuring element of the aforementioned type in such a manner that its adjustment lever can be fastened adjustably to the rear plate by the simplest possible means.

According to the invention, the swing shaft (18) of the adjustment lever (5) is formed by a section of the adjustment lever (5) which engages into a slot (15) in the rear plate (1) and the adjustment lever (5) has a holding section (14) which passes through the slot (15) and engages over the back of the rear plate (1).

By this holding section which engages into a slot, the adjustment lever is held in this region on the rear plate but can nevertheless be shifted in the direction of the slot and swung around a section which engages into the slot. In this way, attachment screws for the holding of the adjustment lever and slots in the adjustment lever for the passage of the attachment screws are unnecessary. The thermostatic bimetallic measuring element of the invention is, therefore, of simpler construction than the previously known thermostatic bimetallic measuring instruments, without being impaired in any way in its manner of operation.

One particularly advantageous embodiment of the invention resides in the fact that the swing shaft (18) is formed by a protuberance which engages into a slot (15) of a holding arm (13) which extends along the slot (15), passes at its end through the slot (15) and is provided there with a holding section (14). In this embodiment, the adjustment lever is doubly held in the slot, on the one hand by the swing shaft and, on the other hand, by the section extending through the slot. It is therefore guided particularly well upon the displacement in the direction of the slot.

By pressing on the holding arm, the result can be obtained that the holding section lifts off from the rear plate in order then to be able to effect the adjustment by means of a setting eccentric (12) if, in accordance with a further embodiment of the invention, the holding arm (13) extends spaced from the rear plate (1) and the holding section (14) of the holding arm (13) rests by spring forces of the holding arm (13) against the back of the rear plate (1).

The adjustment lever is held on the rear plate entirely without attachment screws because the setting eccentric (12), which is adapted to displace the adjustment lever (5) in the rear plate (1) grips, by means of a collar (24), over the adjustment lever (5) on the side facing away from the rear plate (1). Such a setting eccentric holds the adjustment lever on the rear plate in its region.

The setting eccentric is fixed in particularly simple fashion axially in the rear plate if the setting eccentric (12) is fixed axially on the rear of the rear plate (1) by a clamping disk (25) which is pushed over it.

The holding section can be inserted in simple manner into the slot of the rear plate and grip over the rear of the rear plate if the slot (15) in the rear plate (1) is provided on its outer end with a T-shaped widening (16) and the holding section (14) of the holding arm (13) is developed as a T-piece which is directed transverse to the main length of the holding arm (13) and is adapted to be inserted through the T-shaped widening (16).

The T-shaped widening in the slot can be dispensed with if, in accordance with another embodiment of the invention, the holding section (14) is a T-piece which is twisted after its insertion through the slot (15) and thus sits on the rear plate (1) on both sides.

The thermostatic bimetallic measuring element can be produced at particularly little expense if the holding section (14) is developed as a tab which is directed at right angles to the adjustment lever (5) and, upon assembly of the adjustment lever (5), pushed through the slot and then twisted toward one side.

The adjustment lever is specially secured against sliding on the rear plate if a tip (27) developed on the holding section (14) engages into the back of the rear plate.

A further contribution to a reduction in expense is present if the rear plate (1) at the same time forms the circuit board for the thermostatic bimetallic measuring element.

BRIEF DESCRIPTION OF THE DRAWINGS

With the above and other objects and advantages in view, the present invention will become more clearly understood in connection with the detailed description of preferred embodiments, when considered with the accompanying drawings of which:

FIG. 4 is a longitudinal section through an adjustment lever of the thermostatic bimetallic measuring element, FIG. 5 is a side view of the adjustment lever, FIG. 6 is a top view of the adjustment lever, FIG. 11 is a section through another embodiment of a thermostatic bimetallic measuring element, FIG. 12 is a top view of the thermostatic bimetallic measuring element of FIG. 10.

DETAILED DESCRIPTION OF THE PREFERRED EMBODIMENTS

Figure 1:
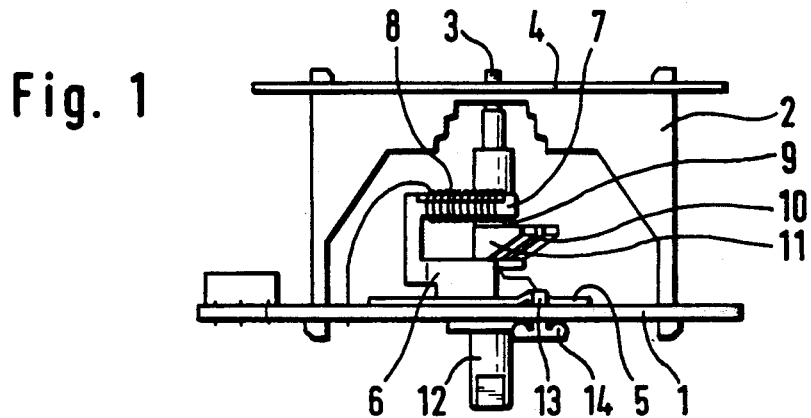
FIG. 1 is a side view of a thermostatic bimetallic measuring element in accordance with the invention.

FIG. 1 shows a rear plate 1 which is developed as a circuit board and with which there is engaged a supporting bridge 2 which, spaced from the rear plate 1, holds a dial 4 through which a pointer shaft 3 passes. From above there rests on the rear plate 1 an adjustment lever 5 on which a U-shaped thermostatic bimetallic body 6 is fastened. The thermostatic bimetallic body 6 is provided with a heating winding 8 on its upper arm 7. If said winding is traversed by current then the arm 7 which is wrapped by it, bends. A pin 9 is arranged on the free end of the arm 7 and engages in a slot guide 10 of an arm 11 which is oriented in radial direction on the pointer shaft 3. The arm 7 thereby swings the pointer shaft 3 by an amount corresponding to a bending of the arm 7.

A setting eccentric 12 by which the adjustment lever 5 can be set extends downward out of the rear plate 1. Furthermore, FIG. 1 shows that the adjustment lever 5 has a holding arm 13 which extends through the rear plate 1 and a T-shaped holding section 14 of which rests on the rear side of the rear plate 1.

Figure 2:
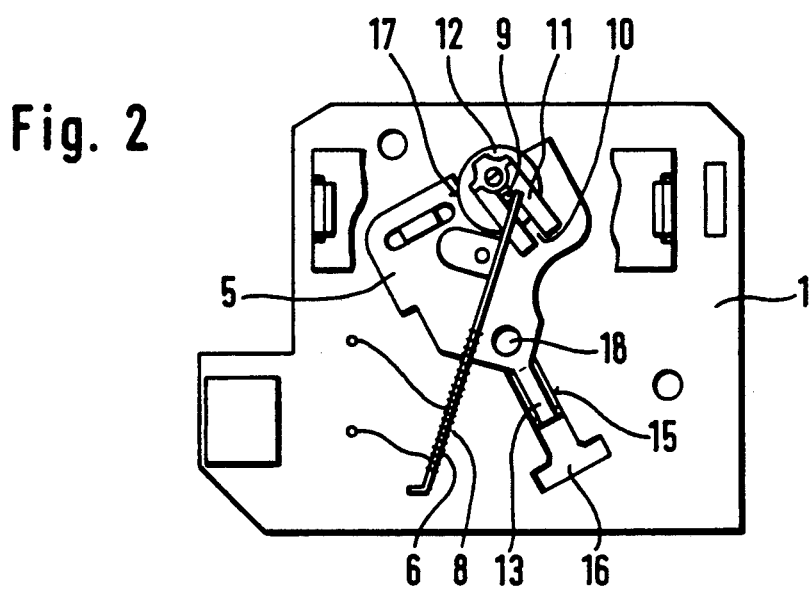
FIG. 2 is a top view of the thermostatic bimetallic measuring element.

FIG. 2 shows that a slot 15, which has a T-shaped widening 16 on its outer end, is provided in the rear plate 1. Furthermore, FIG. 2 shows that the setting eccentric 12 engages into a recess 17 in the adjustment lever 5. If the setting eccentric 12 is turned, then the adjustment lever 5 is swung around a swing shaft 18 which is formed by a protuberance of the adjustment lever 5, the protuberance engaging into the slot 15. The holding arm 13 must for this purpose of course be passed through the slot 15 with corresponding play. The manner of operation of the thermostatic bimetallic measuring element can be clearly noted from FIG. 2 which shows the arm 11, having the slot guide 10 into which the pin 9 engages.

Figure 3:
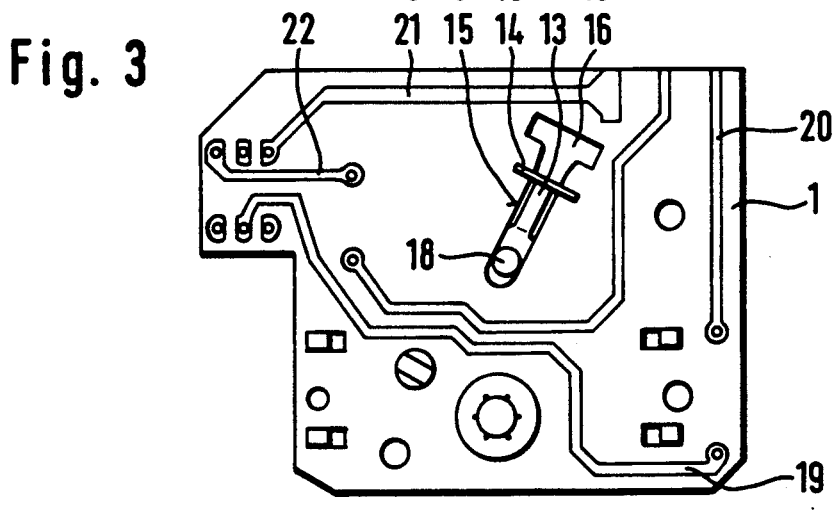
FIG. 3 is a bottom view of the thermostatic bimetallic measuring element of FIGS. 1 and 2.

The bottom view of the rear plate 1 shown in FIG. 3, shows that the T-shaped holding section 14, upon assembly, can be pushed through the T-shaped widening 16 to engage over both sides of the slot 15 after which the adjustment lever 5 is to be pushed in the direction of the setting eccentric 12 shown in FIGS. 1 and 2. It can furthermore be noted from FIG. 3 how the swing shaft 18 produced by a protuberance which into the slot 15. FIG. 3 also shows the conductive paths 19, 20, 21, 22 of a circuit board, which paths are present in the rear plate 1.

FIGS. 4 to 6 show the development of the adjustment lever 5 in greater detail. FIGS. 4 and 5 show that the holding arm 13 extends out of the plane of the adjustment lever 5, and then downward, and that the holding arm is provided on its free end with the holding section 14 by which it engages below the rear plate 1. If the holding arm 13 is pressed in the mounted condition of the adjustment lever 5 against the rear plate 1, then the holding section 14 can be forced away from the rear of the rear plate 1 and the adjustment lever 5.

FIG. 4 also shows the swing shaft 18 produced by a protuberance which shaft is so dimensioned in its diameter that it can engage into the slot 15 of the rear plate 1.

FIG. 6 shows that the holding arm 13 lies approximately opposite the recess 17, into which the setting eccentric 12 shown in FIGS. 1 and 2 engages. The position assumed by the holding section 14 before it has been bent into the bent position shown in solid line is indicated in dashed line in FIG. 6.

Figure 7:
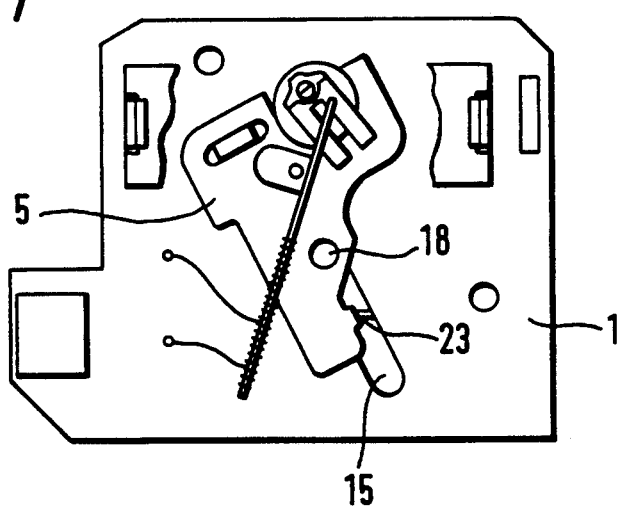
FIG. 7 is a top view of a second embodiment of a thermostatic bimetallic measuring element.
Figure 8:
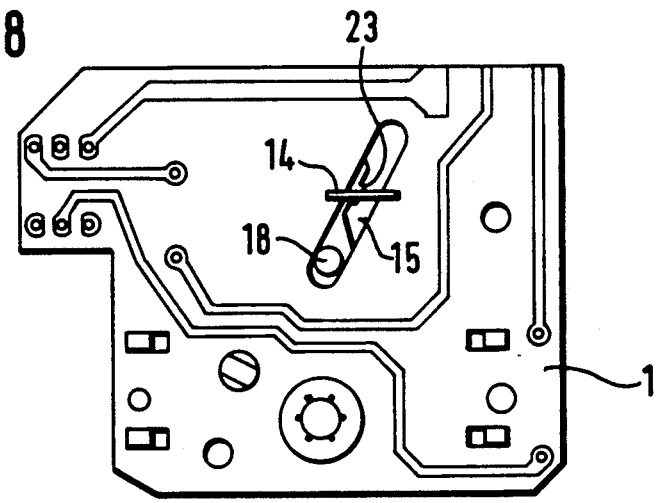
FIG. 8 is a bottom view of the thermostatic bimetallic measuring element of FIG. 7.

In the embodiment of FIGS. 7 and 8, the adjustment lever 5 does not have a holding arm but rather there is developed directly on it a section 23 which engages through the slot 15 and, as can be noted from FIG. 8, holds the holding section 14 on the back of the rear plate 1. This section is aligned with the slot 15 upon the mounting of the adjustment lever 5 and is twisted about 45 degrees after it has been passed through the slot 15 so that it sits on the back of the rear plate 1 on both sides of the slot 15. In the same way as in the preceding embodiment, the adjustment lever 5 has a swing shaft 18 which is formed by a protuberance and by which it engages into the slot 15.

Figure 9:
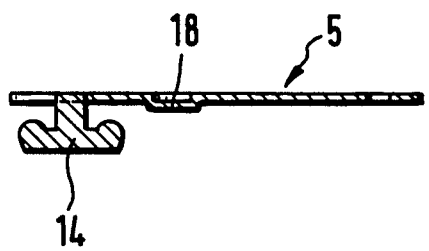
FIG. 9 is a longitudinal section through the adjustment lever of the thermostatic bimetallic measuring element of FIGS. 6 and 7.
Figure 10:
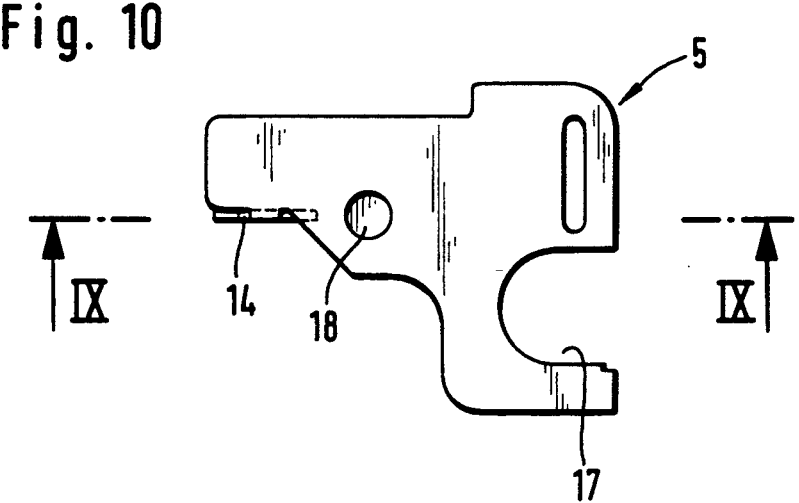
FIG. 10 is a top view of the adjustment lever of FIG. 9.

The exact shape of the adjustment lever 5 of the embodiment of FIGS. 7 and 8 is shown in FIGS. 9 and 10. FIG. 9 shows that the holding section 14, in the same way as in the embodiment described above, has a symmetrical form and includes two arcuate end regions for contacting the back of the rear plate 1. Differing from the first embodiment, the holding section 14 is secured directly to the adjustment lever 5 without use of a holding arm.

FIG. 11 shows that the setting eccentric 12, is held to the adjustment lever 5 by a collar 24 located above on the adjustment lever 5. In this way, the collar 24 and the eccentric 12 hold the adjustment lever 5 on the rear plate 1. The setting eccentric 12, on its part, is fixed axially on the rear plate 1 by a clamping disk 25 which is pushed over it from the back of the rear plate 1. FIG. 11 shows more clearly than the preceding figures how the upper arm 7 of the thermostatic bimetallic body 6 engages by its pin 9 into the arm 11 and can thereby swing the pointer shaft 3. In addition to the dial 4, FIG. 11 also shows a pointer 26 disposed on the pointer shaft 3.

As shown in FIG. 12, in this embodiment the slot 15 is relatively narrow and extends up to the edge of the rear plate 1. A section 23 of the adjustment lever 5 again passes through the slot 15. On the free end of this section 23, a tab is developed as holding section 14, as can be noted from FIG. 11. This tab is provided at its outer end with a tip 27. After the mounting of the adjustment lever 5, the tab-like holding section 14 is twisted toward one side so that its tip 27 comes onto the back of the rear plate 1 and thereby fixes the adjustment lever 5 in position.

We claim:

1. A thermostatic bimetallic measuring device comprising
   a rear plate having a first slot and a hole;
   a supporting bridge fastened to the rear plate;
   a dial spaced from the rear plate and supported by said bridge;

a first shaft which is pivotably mounted on the rear plate and extends through said dial, there being a pointer supported by the shaft at an end of the shaft;

a first arm extending from said first shaft and located between said rear plate and said dial, the first arm having a slot guide;

a setting eccentric coaxially mounted with said shaft;

a platelike adjustment lever with a recess to engage the setting eccentric, there being a swing shaft inserted in the first slot of said rear plate;

a holding arm with a holding section, said holding arm extending from said adjustment lever;

a bimetallic body fastened to the adjustment lever, said bimetallic body having a pin which engages the slot guide of said first arm; and wherein the adjustment lever is displaceably fastened to the rear plate by clamping spring forces produced by said holding arm, the holding arm extending through said first slot, the holding section of said first arm being urged by said clamping forces against a back of the rear plate.

2. A thermostatic bimetallic measuring device comprising a bimetallic body, an adjustment lever, a rear plate, and a swing shaft which is displaceable in the rear plate, the bimetallic body being positioned on the adjustment lever; and wherein the adjustment lever is held in swingable manner on a front side of the rear plate about the swing shaft;

said rear plate includes a slot, and said swing shaft is formed by a portion of said adjustment lever which extends into and engages with said slot;

said adjustment lever has a holding section which passes through said slot and engages over a back of said rear plate;

said swing shaft is formed by a protuberance which engages into said slot;

said lever includes a holding arm which extends along said slot for connection with said holding section;

said holding arm extends spaced from said rear plate; and said holding section of the holding arm rests by spring forces of the holding arm against the back of said rear plate.

3. A measuring device according to claim 2, further comprising a setting eccentric and a collar; and wherein said setting eccentric acts to displace said adjustment lever and grips, by means of said collar, upon said adjustment lever.

4. A measuring device according to claim 3, further comprising a clamping disk; and wherein said setting eccentric is fixed axially on the back of the rear plate by said clamping disk, the clamping disk being pushed upon said eccentric.

5. A measuring device according to claim 2, wherein said slot in the rear plate is provided on its outer end with a T-shaped widening; and said holding section of the holding arm is developed as a T-piece which is directed transverse to a longitudinal axis of the holding arm and is adapted to be inserted through the T-shaped widening.

6. A measuring device according to claim 5, wherein said holding section is a T-piece which is twisted after its insertion through the slot, said holding section sitting on the rear plate on both sides of the slot.

7. A measuring device according to claim 2, wherein said holding section is developed as a tab which is directed at right angles to said adjustment lever and, upon assembly of the adjustment lever, passes through said slot and then twists toward one side of the slot.

8. A measuring device according to claim 7, wherein a tip is developed on the holding section to engage into the back of the rear plate.

9. A measuring device according to claim 8, further comprising a circuit board disposed on said rear plate concurrently with the use of the rear plate for thermostatic measurements by said bimetallic body.

* * * * *